(12) United States Patent
Lin

(10) Patent No.: US 6,823,560 B2
(45) Date of Patent: Nov. 30, 2004

(54) BUFFERING STRUCTURE FOR WHEELS

(76) Inventor: Ching-Sung Lin, No. 22-2, Lane 143, Tan-Hsing Street, Shu-Lin City, Taipei Hsien (TW)

( * ) Notice: Subject to any disclaimer, the term of this patent is extended or adjusted under 35 U.S.C. 154(b) by 56 days.

(21) Appl. No.: 10/261,589

(22) Filed: Oct. 2, 2002

(65) Prior Publication Data

US 2004/0064916 A1 Apr. 8, 2004

(51) Int. Cl.⁷ .............................................. A47B 91/00
(52) U.S. Cl. ......................................... 16/44; 16/35 D
(58) Field of Search ........................ 16/44, 35 D, 46; 267/257, 292; 280/11.27, 11.28

(56) References Cited

U.S. PATENT DOCUMENTS

| | | | | |
|---|---|---|---|---|
| 2,066,187 A | * | 12/1936 | Piron | ........................ 267/280 |
| 2,700,173 A | * | 1/1955 | Huffman | ........................ 16/44 |
| 3,041,656 A | * | 7/1962 | Goodall | ........................ 16/44 |
| 3,572,677 A | * | 3/1971 | Damon | ........................ 267/281 |
| 3,881,711 A | * | 5/1975 | Lemaitre | ........................ 267/282 |
| 4,002,327 A | * | 1/1977 | Damon | ........................ 267/281 |
| 4,312,096 A | | 1/1982 | Schubert et al. | |
| 5,305,496 A | | 4/1994 | Gagnon et al. | |
| 5,493,755 A | * | 2/1996 | Kindstrand et al. | ............ 16/46 |
| 6,499,184 B2 | * | 12/2002 | Plate | ............................ 16/44 |
| 6,532,623 B1 | * | 3/2003 | Watanabe | .................. 16/35 D |

* cited by examiner

*Primary Examiner*—Suzanne Dino Barrett
*Assistant Examiner*—Mark Williams
(74) *Attorney, Agent, or Firm*—Birch, Stewart, Kolasch & Birch, LLP

(57) ABSTRACT

A buffering structure for wheels comprises at least a linking plate, a spindle, two concentric rigid hollow ferrules or up, and a kind of firm buffer material. When applying this invention, an outer end of the linking plate is hitched on the wheel shaft while the spindle is connected with a shaft carrier under a pushcart's deck. Therefore, in the event a wheel is conflicting with a curb for example, the impact of the wheel is imparted to the through hole in the outer end of the linking plate via the shaft, such that the outer end is driven to rotate surrounding the spindle to thereby convert the impact into a rotation force, and meanwhile, the buffer material stuffed inside and outside the smaller rigid ferrule is interacted with the rotating smaller ferrule and deformed to absorb the rotation force to alleviate that impact.

7 Claims, 5 Drawing Sheets

BUFFERING STRUCTURE FOR WHEELS

FIELD OF THE INVENTION

This invention relates generally to a buffering structure, more particularly, it relates to a buffering structure for wheels capable of absorbing vertical vibration-energy instantaneously.

BACKGROUND OF THE INVENTION

The pushcarts are often employed for a short-range transportation of various goods, in which the buffering function is of extreme importance particularly for those used for transporting valuable instruments.

The buffering structure of a generic pushcart is usually comprised of diverse leaf springs for buffering external impacts. However, since those resilient devices are mostly made of rigid material that transmits force rapidly, therefore the buffering structure responses too slowly to absorb the impact in time that would probably run a risk of spoiling a carried valuable instrument.

In view of the mentioned defect, this invention is intended to propose a buffering structure for wheels for eliminating the existing drawbacks.

SUMMARY OF THE INVENTION

The primary objective of this invention is to provide a buffering structure for wheels, in which a buffer material is stuffed for absorption of an internal rotation force to make use of its buffering functions.

Another objective of this invention is to provide a buffering structure for wheels, in which an externally applied impact can be converted into a rotation force so as to decrease the transmission speed of the impact.

In order to achieve abovesaid objectives, the buffering structure for wheels should comprise at least a linking plate, a spindle, two concentric rigid hollow ferrules or up, and a kind of firm buffer material, in which the spindle is first disposed in the common center of the concentric ferrules, then the space between ferrules and between the smaller ferrule and the spindle is so tightly filled with the buffer material that no relative displacement among them will occur, and a through hole of the linking plate is hitched on the spindle, meanwhile, two arcuate portions and an insertion portion of the linking plate are inserted in the flanges and an insertion groove of the smaller ferrule respectively. In applying this invention, an outer end of the linking plate is hitched on the wheel shaft while the spindle is connected with a shaft carrier under a pushcart's deck. Therefore, in the event a wheel is conflicting with a curb for example, the impact of the wheel is imparted to the through hole in the outer end of the linking plate via the shaft, such that the outer end is driven to rotate surrounding the spindle to thereby convert the impact into a rotation force. Meanwhile, the buffer material stuffed inside and outside the smaller rigid ferrule is interacted with the rotating smaller ferrule and deformed to absorb the rotation force to alleviate that impact.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
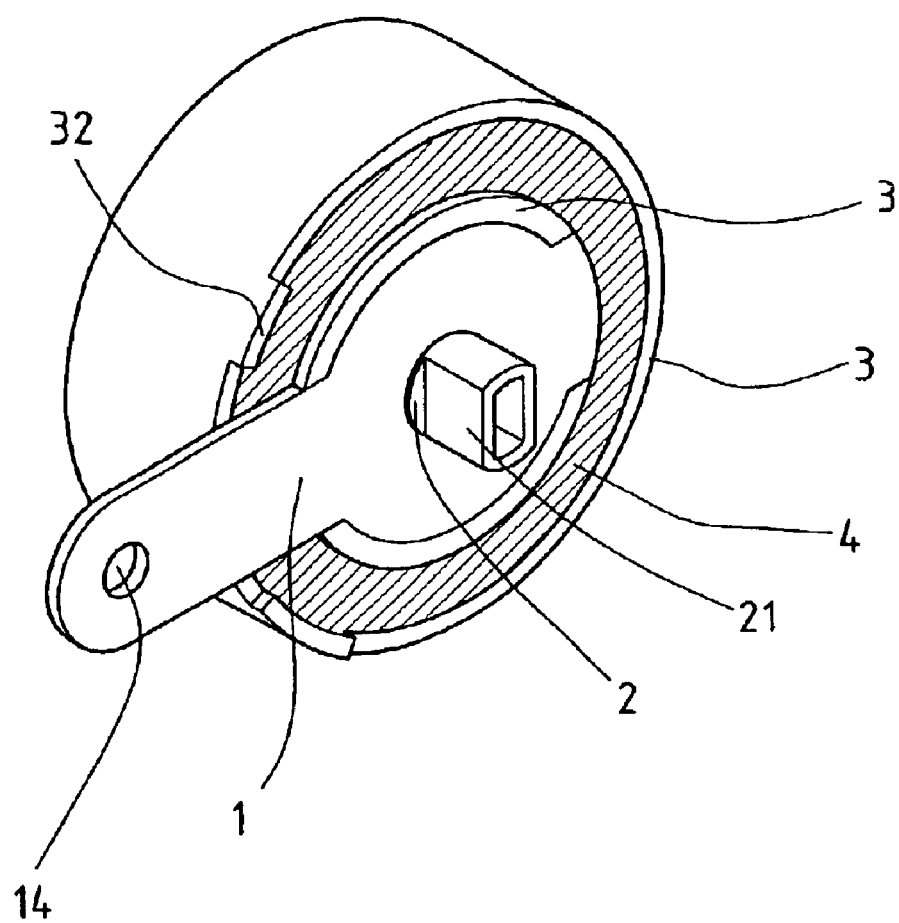
FIG. 1 is three-dimensional assembled view of an embodiment of this invention.
Figure 2:
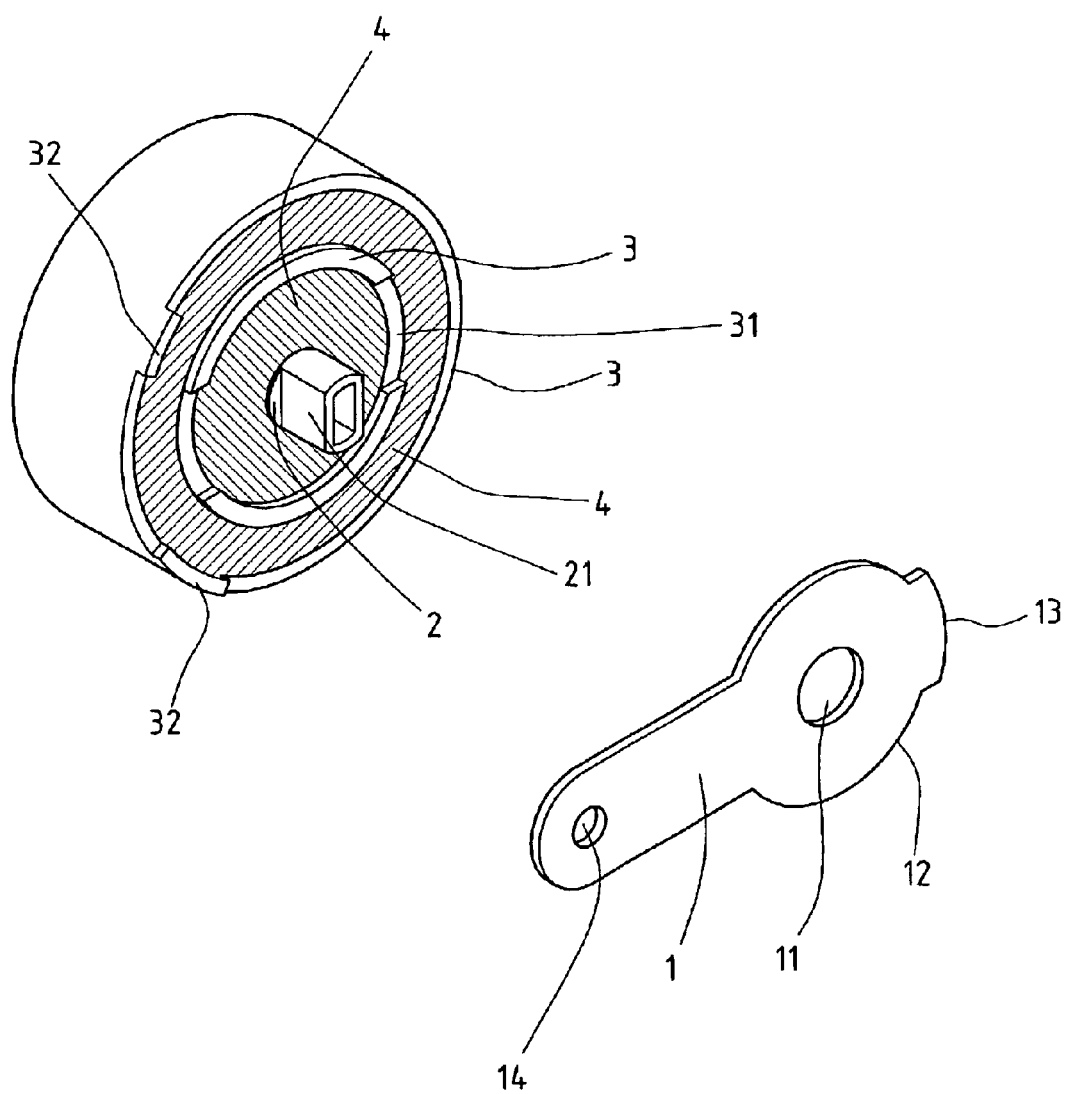
FIG. 2 is a three-dimensional exploded view of the embodiment of this invention.

As indicated in FIGS. 1 and 2, a buffering structure for wheels is comprised of at least a linking plate 1 or more, a spindle 2, two concentric rigid hollow ferrules 3 or up with different diameters, and a kind of firm buffer material 4.

A through hole 11, 14 is perforated at an inner end (right end) and an outer end (left end) of the linking plate 1, respectively, in which an arcuate portion 12 is formed at the upper and the lower side of the through hole 11. An end verge of the inner end is an insertion portion 13.

The spindle 2 has two flat connection ends 21 jointed with a shaft carrier 6 under a pushcart's deck for limiting rotation of the spindle 2.

At least two concentric rigid ferrules 3 irrespective of shapes are available, in which the smaller one has at least one insertion groove 31 for accommodating the linking plate 1 as well as the insertion portion 13 thereof.

The firm buffer material 4 could be a firm material of any kinds, and it is a rubber material in this case.

When assembling, the spindle 2 is first disposed in the common center of the concentric ferrules 3, then the space between ferrules 3 and between the smaller ferrule 3 and the spindle 2 is so tightly filled with the buffer material 4 that no relative displacement among them will occur, and the through hole 11 is hitched on the spindle 2, meanwhile, the arcuate portion 12 and the insertion portion 13 of the linking plate 1 are inserted in the flanges and the insertion groove 31 of the smaller ferrule 3, respectively.

Figure 3:
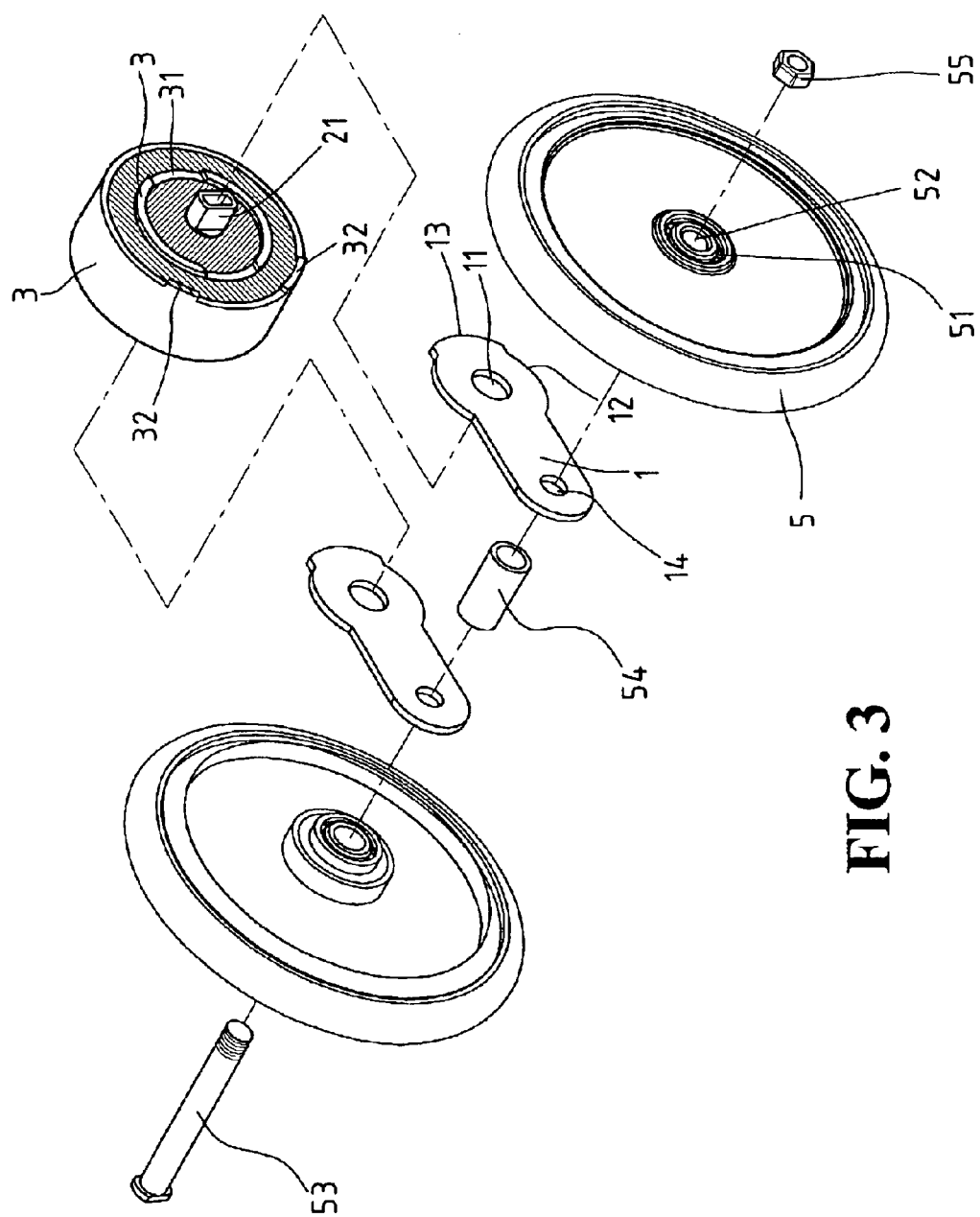
FIG. 3 is a three-dimensional exploded view showing that the embodiment of this invention is mounted on a wheel.
Figure 4:
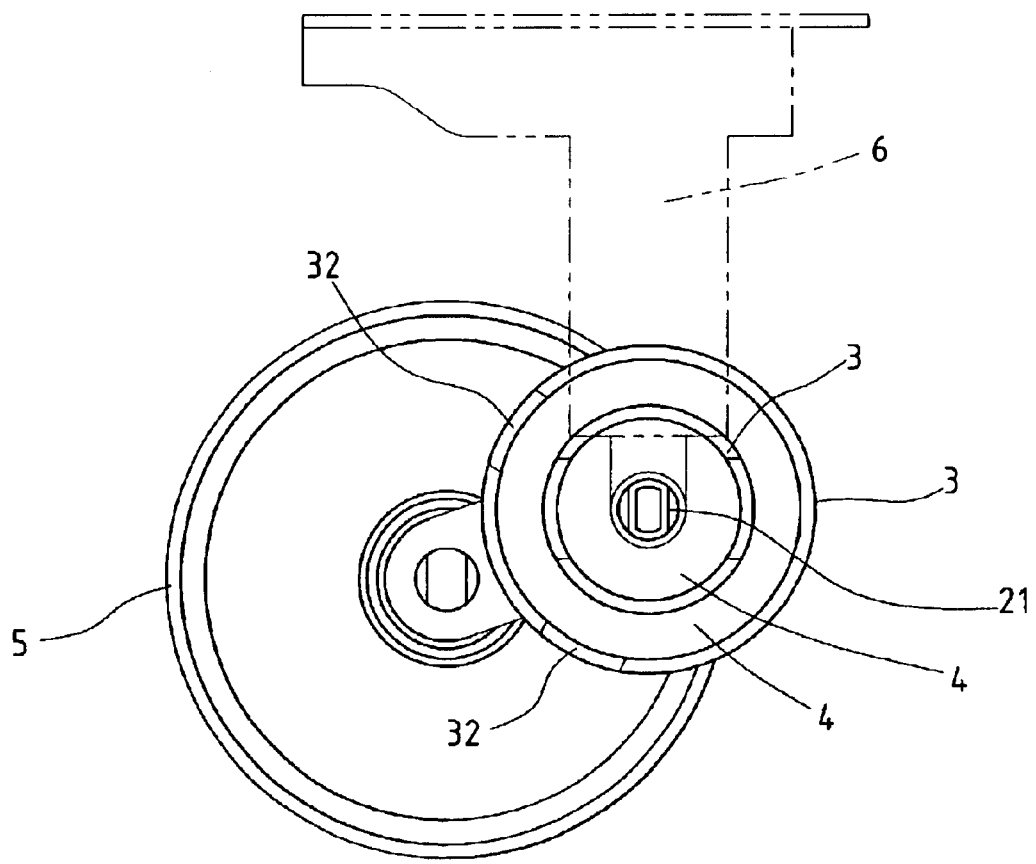
FIG. 4 is a lateral cutaway partial view of the embodiment of this invention.
Figure 5:
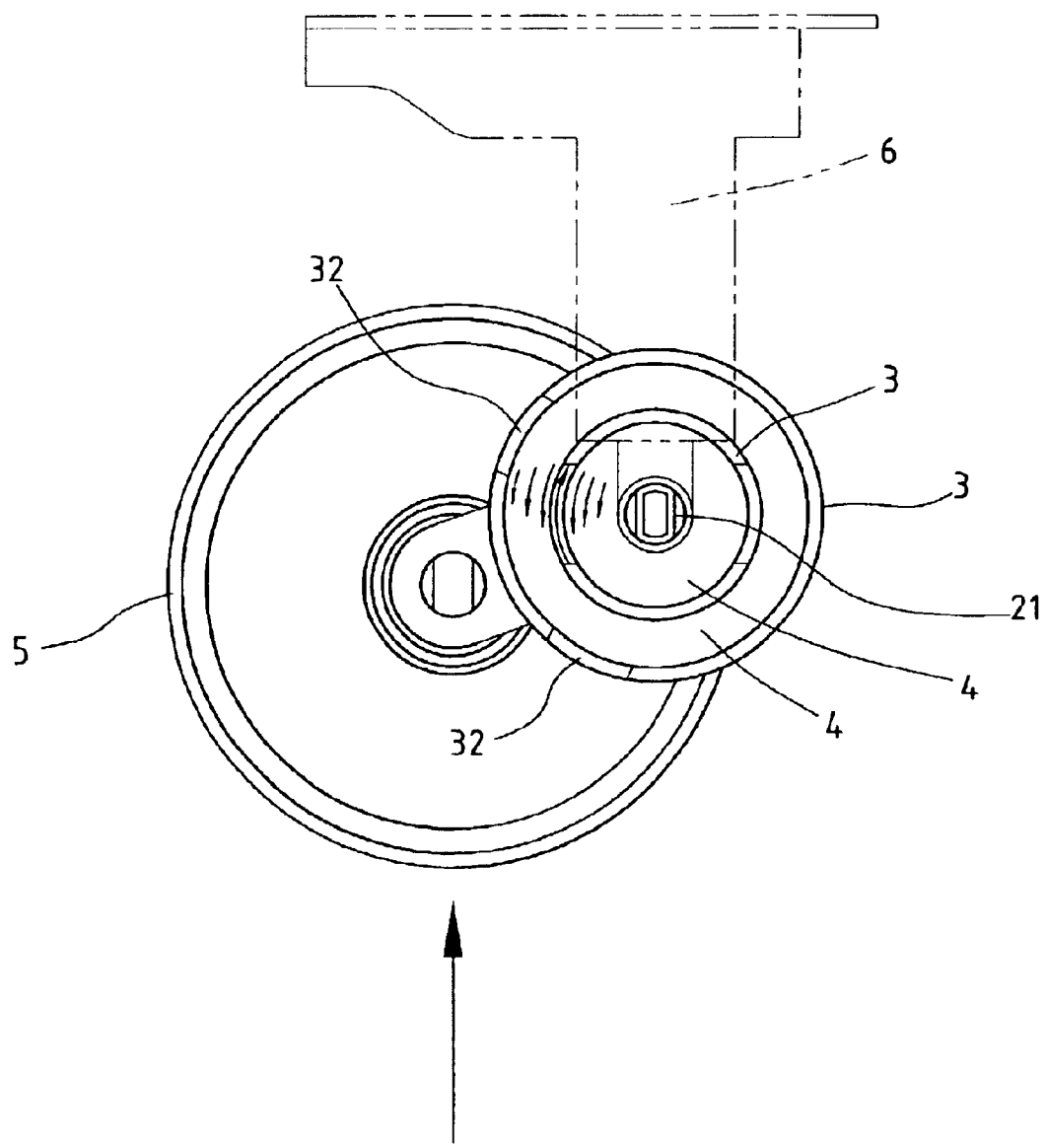
FIG. 5 is a schematic view showing the action of the embodiment of this invention.

When this invention is applied, as shown in FIGS. 3~5, a wheel shaft 53 is supposed to penetrate through a spindle hole 52 of a bearing 51, the through hole 14, a tubular segment 54, another through hole 14, another spindle hole 52, and to be locked by a nut 55. The flat connection ends 21 are then connected with the shaft carriers 6 to have the mounting job completed. During transportation, in the event a wheel 5 is conflicting with a curb, the impact of the wheel 5 is imparted to the through hole 14 in the outer end of the linking plate 1 via the shaft 53, such that said outer end is driven to rotate surrounding the spindle 2 to thereby convert the impact into a rotation force. Meanwhile, the buffer material 4 stuffed inside and outside the smaller rigid ferrule 3 is interacted with the rotating smaller ferrule 3 and deformed to absorb the rotation force to alleviate that impact.

Moreover, in order to maintain a carried matter under safety conditions, at least a protruding portion 32 is formed laterally in the rim of the larger rigid ferrule 3 such that the linking plate 1 can be stopped for preventing the carried matter from being dropped away in the event that the buffer material 4 is ruptured when the impact to the wheel 5 is overlarge.

In short, a buffering structure for wheels of this invention is carried out to convert the upward impact applied onto a wheel 5 into a rotation force in order to decrease the transmission speed of the impact, which is meanwhile absorbed by a kind of stuffed buffer material 4, so that a carried matter can be held stably.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A buffering structure for wheels, comprising:
   at least a linking plate, in which an inner and an outer end are connected with a spindle and a wheel shaft respectively;
   a spindle having two ends connected to a shaft carrier under a pushcart's deck;
   two concentric rigid ferrules with different diameters; and
   a firm buffer material; in which, said spindle is first disposed in the common center of the concentric ferrules, then the space between ferrules and between the smaller ferrule and said spindle is tightly filled with the buffer material, and the inner end of the linking plate is connected with said spindle, and in which at least a protruding portion is formed laterally in a rim of the larger rigid ferrule such that the linking plate can be stopped when an impact to the wheel is overlarge.

2. The buffering structure for wheels according to claim 1, in which a through hole is perforated in the inner and the outer end of said linking plate for jointing with said spindle and wheel shaft.

3. The buffering structure for wheels according to claim 1, in which an arcuate portion is formed at an upper side and a lower side of said linking plate respectively, and an end verge of the inner end of said linking plate is an insertion portion.

4. The buffering structure for wheels according to claim 1, in which a flat connection end is formed at each of two ends of said spindle.

5. The buffering structure for wheels according to claim 1, in which the shape of said rigid ferrules is not limited to circle and the amount thereof is two pieces at least.

6. The buffering structure for wheels according to claim 1, in which an insertion groove is formed in a smaller rigid ferrule for inserting and fixing said linking plate and its insertion portion.

7. The buffering structure for wheels according to claim 1, in which said firm buffer material is rubber.

* * * * *